US006808301B2

(12) United States Patent
Byggmäster et al.

(10) Patent No.: US 6,808,301 B2
(45) Date of Patent: Oct. 26, 2004

(54) VEHICULAR LAMP HAVING A VIBRATION-DAMPENING LAMP-ATTACHMENT RING

(75) Inventors: Klas Byggmäster, Furuholmen (FI); Jari Korpi, Pietarsaari (FI)

(73) Assignee: Oy B. Herrmans AB, Pietarsaari (FI)

( * ) Notice: Subject to any disclaimer, the term of this patent is extended or adjusted under 35 U.S.C. 154(b) by 41 days.

(21) Appl. No.: 10/246,416

(22) Filed: Sep. 19, 2002

(65) Prior Publication Data

US 2003/0058648 A1 Mar. 27, 2003

(30) Foreign Application Priority Data

Sep. 21, 2001 (FI) .............................................. 20011862

(51) Int. Cl.[7] .................................................. B60Q 1/00

(52) U.S. Cl. ....................... 362/546; 362/267; 362/306; 362/374; 362/455

(58) Field of Search ................................ 362/306, 369, 362/374, 375, 390, 507, 546, 548, 549, 267, 455

(56) References Cited

U.S. PATENT DOCUMENTS 3,065,340 A * 11/1962 Mead et al. ................ 362/369
3,067,326 A 12/1962 Knapp
4,422,136 A 12/1983 Newman et al.
5,491,619 A 2/1996 Gill
5,618,098 A * 4/1997 Naganawa et al. ......... 362/549

* cited by examiner

*Primary Examiner*—Stephen F. Husar
(74) *Attorney, Agent, or Firm*—Burns, Doane, Swecker & Mathis, L.L.P.

(57) ABSTRACT

A vehicular headlamp has an outer housing including a dome cap and an annular frame disposed at a front side of the dome cap. A lamp unit is disposed within the outer housing and includes a reflector mirror carrying a bulb, and a protective shield extending across a front side of the reflector mirror. A resilient attachment ring is interposed between an inner periphery of the frame and outer peripheries of the reflector mirror and the protective shield for connecting the lamp unit to the frame and for dampening vibrations. The frame includes a rearwardly open groove formed at a front edge thereof, and the attachment ring includes a forwardly projecting support leg received in the groove.

5 Claims, 1 Drawing Sheet

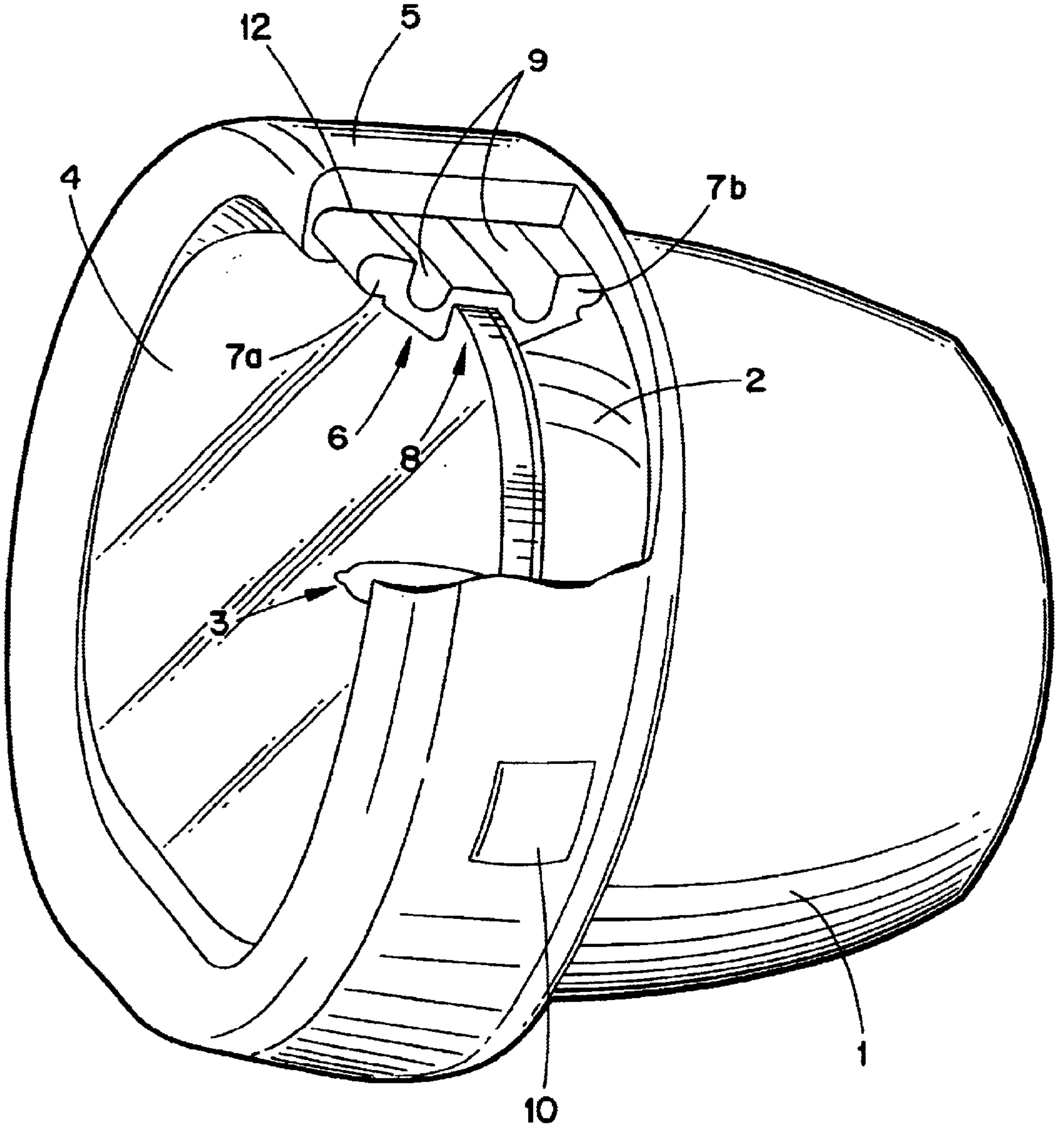
12
5
9
4
7b
7a
2
6
8
3
10
1

VEHICULAR LAMP HAVING A VIBRATION-DAMPENING LAMP-ATTACHMENT RING

This application claims priority under 35 U.S.C. §§119 to patent application Ser. No. 20011862 filed in Finland on Sep. 21, 2001, the entire content of which is hereby incorporated by reference.

BACKGROUND OF THE INVENTION

This invention relates to a vehicular lamp, comprising a dome cap, a reflector mirror, a bulb, a protective shield, and a frame for securing the protective shield.

For example, Gill U.S. Pat. No. 5,491,619 describes a vehicular lamp of this type, wherein attempts have been made to dampen bulb vibrations by means of rubber plugs. There are a multitude of prior known anti-vibration solutions of this type. However, experiments and experience have shown that small rubber plugs, provided with an attachment head, are not sufficient for the dampening of bulb vibration. The dampening of a bulb requires a very large heavy mass, which remains stationary despite vibration. A vehicular lamp of the invention is characterized in that inside the frame is a resilient attachment ring encircling the frame and supporting the protective shield and the reflector mirror as well as the bulb. Thus, a major part of the entire lamp can be supported from the vibration dampening and resilient attachment ring. Tests have shown that this type of vehicular lamp of the novel invention provides up to a ten-fold saving for the bulb.

DESCRIPTION OF THE DRAWINGS

The invention will now be described by way of example with reference to the sole FIGURE which shows a vehicular lamp in a partially cut-away view.

DESCRIPTION OF A PREFERRED EMBODIMENT

The lamp consists of a dome cap 1, a reflector mirror 2, a bulb 3, a protective shield 4, and a frame 5 for securing the protective shield. Inside the frame 5 is a resilient attachment ring 6, encircling the frame and supporting the protective shield and the reflector plate as well as the bulb. The attachment ring 6 is provided with front and rear support legs 7*a*, 7*b*, extending in cross section towards the front and rear edges, respectively, of the frame 5 and having therebetween an attachment groove 8 for retaining the protective shield and the reflective mirror. At the front end of the frame 5 there is shown a rearwardly open groove 12 which receives the front support leg 7*a*. Between the support legs 7*a*, 7*b* and the attachment groove 8 are recesses 9 for more resilience to the attachment ring 6. Although the bulb need not be replaced often, the lamp is provided with quick-release buttons 10, which are located on the sides of the frame 5 and by means of which the frame and the components mounted on the frame are readily and quickly removable for a replacement of the bulb.

What is claimed is:

1. A vehicular headlamp comprising:

an outer housing including a dome cap and an annular frame disposed at a front side of the dome cap;

a lamp unit disposed within the outer housing and including:

a reflector mirror carrying a bulb, and a protective shield extending across a front side of the reflector mirror; and a resilient attachment ring interposed between an inner periphery of the frame and outer peripheries of the reflector mirror and the protective shield and connecting the lamp unit to the frame;

wherein the frame includes a rearwardly open groove formed at a front edge thereof, and the attachment ring includes a forwardly projecting support leg received in the groove.

2. A vehicular headlamp comprising:

an outer housing including a dome cap and an annular frame disposed at a front side of the dome cap;

a lamp unit disposed within the outer housing and including:

a reflector mirror carrying a bulb, and a protective shield extending across a front side of the reflector mirror; and a resilient attachment ring interposed between an inner periphery of the frame and outer peripheries of the reflector mirror and the protective shield and connecting the lamp unit to the frame;

wherein the frame includes spaced apart front and rear edges, and the attachment ring includes:

front and rear support legs extending towards the front and rear edges of the frame, an attachment groove disposed between the front and rear support legs for retaining the outer peripheries of the protective shield and the reflective mirror, and recesses disposed between the attachment groove and respective front and rear support legs for enhancing the resiliency of the attachment ring.

3. The vehicular lamp according to claim 2 wherein the front edge of the frame includes a rearwardly open groove receiving the front support leg.

4. The vehicular lamp according to claim 2 wherein the attachment groove comprises an annular, radially inwardly open groove, and the recesses constitute annular radially outwardly open grooves.

5. A vehicular headlamp comprising:

an outer housing including a dome cap and an annular frame disposed at a front side of the dome cap;

a lamp unit disposed within the outer housing and including:

a reflector mirror carrying a bulb, and a protective shield extending across a front side of the reflector mirror; and a resilient attachment ring interposed between an inner periphery of the frame and outer peripheries of the reflector mirror and the protective shield and connecting the lamp unit to the frame;

wherein the frame includes quick-release buttons by which the frame and the lamp unit are removable for a bulb replacement.

* * * * *